United States Patent [19]

Oishi et al.

[11] 4,341,093

[45] Jul. 27, 1982

[54] DEVICE FOR LEADING COOLING LIQUID OUT OF ROTARY ELECTRIC MACHINE WITH LIQUID COOLED ROTOR

[75] Inventors: Norio Oishi; Kouichi Okamoto; Shoji Furukado, all of Kobe; Masaki Sakuyama, Ashiya, all of Japan

[73] Assignee: Mitsubishi Denki Kabushiki Kaisha, Tokyo, Japan

[21] Appl. No.: 212,043

[22] Filed: Dec. 1, 1980

[51] Int. Cl.³ .............................................. F25B 31/00
[52] U.S. Cl. ....................................... 62/505; 310/54; 310/61; 277/15
[58] Field of Search ...................... 62/55, 505; 310/54, 310/64, 61; 277/15

[56] References Cited

U.S. PATENT DOCUMENTS

3,733,501  5/1973  Heller et al. ........................... 310/54
3,831,046  8/1974  Curtis et al. ........................... 310/54
3,835,919  9/1974  Lambrecht et al. ................... 310/54
3,922,573 11/1975  Pluschke ............................... 310/54
4,114,058 12/1978  Albaric ................................. 310/54
4,114,059 12/1978  Albaric et al. ........................ 310/54

Primary Examiner—Ronald C. Capossela
Attorney, Agent, or Firm—Sughrue, Mion, Zinn, Macpeak & Seas

[57] ABSTRACT

A device for conducting cooling liquid out of a liquid cooled rotor type rotary electric machine in which a sealing means is provided for preventing the leakage of cooling liquid from an outlet chamber adapted to receive the cooling liquid discharged from the rotary electric machine. The sealing means employs a thread seal and a rubber seal in combination. The rubber seal is provided in such a manner as to surround a cooling liquid supplying and draining pipe and so that it is expanded or contracted according to the pressure of gas introduced inside the rubber seal to adjust the gap between the rubber seal and the pipe. The pressure of gas is controlled according to the speed of rotation of the rotor shaft or the amount of liquid leakage.

7 Claims, 11 Drawing Figures

DEVICE FOR LEADING COOLING LIQUID OUT OF ROTARY ELECTRIC MACHINE WITH LIQUID COOLED ROTOR

BACKGROUND OF THE INVENTION

1. Field of the Invention

The present invention relates to a liquid cooled rotor type rotary electric machine whose rotor is cooled by circulating a cooling liquid therein. More particularly, the invention relates to a device for conducting the cooling liquid out of the machine.

2. Description of the Prior Art

As is well known in the art, any increase of the capacity of a rotary electric machine depends on the ability to suppress increases in the temperature thereof, that is, how to effectively cool the machine. In other words, the maximum permissible capacity of a rotary electric machine is determined by its maximum temperature and hence its ability to dissipate heat. On the other hand, there have been strong demands for increased capacity of rotary electric machines including electric generators and especially turbine generators in order to improve the efficiency of power plants. For this purpose, a cooling technique of circulating hydrogen gas for cooling a turbine generator has been employed thus increasing the capacity thereof. However, this technique appears to have met its limit for increased capacity. Accordingly, it is necessary to provide another suitable cooling technique.

In order to meet this requirement, a technique has been proposed in which, instead of hydrogen gas, a cooling fluid such as water which is high in cooling efficiency is employed as the cooling medium. According to this technique, a cooling liquid is circulated in the stator to cool the latter. If this technique could be developed satisfactorily to cause the cooling liquid to circulate not only in the stator but also in the rotor, then the cooling effect would be greatly improved.

For instance, in the case of a turbine generator, its rotor rotates at a high speed of 3600 rpm. (60 Hz). Therefore, the forcing of the cooling liquid through the desired paths in high-speed rotating element is a problem the solution of which is considerably difficult. This difficult problem has retarded the commercialization of liquid cooled rotor type rotary electric machines.

Figures 1, 2:
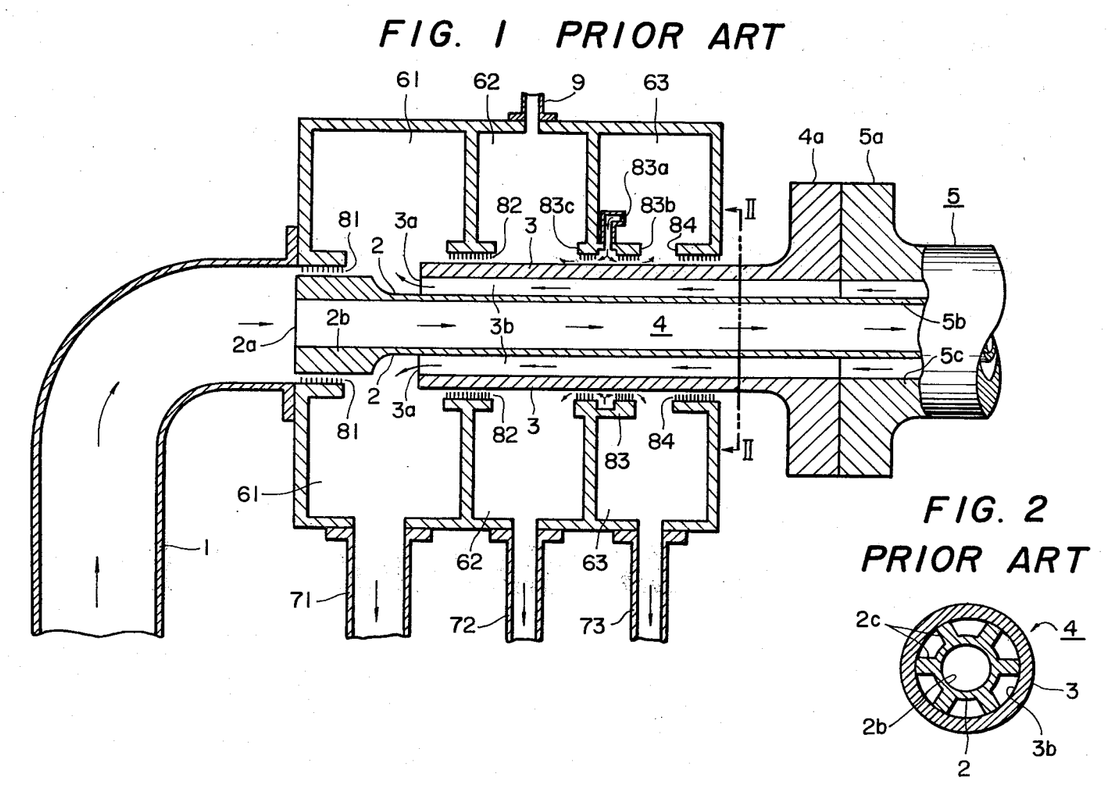
FIG. 1 is a longitudinal sectional view showing a conventional cooling liquid conducting device.
FIG. 2 is a sectional view taken along line II—II in FIG. 1.

FIG. 1 shows a device for directing the flow of cooling liquid in a liquid cooled rotor to which the technical concept of the invention is applicable. In FIG. 1, a reference numeral 1 designates an inlet pipe through which a cooling liquid such as pure water is supplied with the aid of a supply pump (not shown), 2 a cylindrical liquid inflow pipe for receiving the cooling liquid from the inlet pipe 1 through an opening 2a with the hollow interior 2b forming the inflow path of the cooling liquid, and 3 a liquid outflow pipe placed over the inflow pipe 2 with a gap 3b providing a predetermined clearance therebetween. Pure water is preferred so as to not corrode any of the pipes with impurities. The gap 3b is utilized as the outflow path of the cooling liquid. The outflow pipe 3 has an opening 3a through which the cooling liquid is discharged. The outflow pipe 3 and the inflow pipe 2 are connected together to form a cooling liquid supplying and draining pipe 4 as shown in FIG. 2. As is apparent from FIG. 2, the inflow pipe 2 has a plurality of (six in the case of FIG. 2) protruding pieces 2c extending from the outer wall of the pipe 2. The protruding pieces 2c serve as spacers which couple the inflow pipe 2 and the outflow pipe 3 together and reinforce the pipes 2 and 3. The inflow pipe 2 with the protruding pieces 2c is made integral with the outflow pipe 3, for instance, by shrink fitting, to form the supplying and draining pipe 4. The pipe 4 has a flange 4a at its end which is coupled to the flange 5a of the shaft of the rotor of a rotary electric machine with bolts or the like (not shown). The rotor coil (not shown) is mounted on the shaft 5. As is clear from FIG. 1, a inflow path 5b and a outflow path 5c are formed in the rotor shaft 5 and are communicated with the inflow path 2b and the outflow path 3b in the supplying and draining pipe 4, respectively, so that the cooling liquid supplied through the inflow path 5b, after circulating in the rotor coil, is discharged into the outflow path 5c. In FIG. 1, the arrows indicate the flow of the cooling liquid. As described above, the cooling liquid, after cooling the rotor coil by circulating therein, is drained from the opening 3a of the outflow pipe 3 through the outflow paths 5c and 3b.

The device has a first outlet chamber 61 for receiving the liquid discharged from the opening 3a. The chamber 61 is so designed that it is always filled with the cooling liquid in order to prevent contamination of the cooling liquid (pure water) which might occur if the liquid were to be brought into contact with the atmosphere. The first outlet chamber 61 has a first outlet pipe 71 for conducting the cooling liquid out of the chamber 61. The cooling liquid discharged from the first outlet pipe 71 is not brought into contact with atmospheric air, that is, it is prevented from being contaminated, and therefore it can be resupplied to the inlet pipe 1 through a supply pump (not shown) after its temperature is decreased by a heat exchanger or the like (not shown). That is, the water can be recirculated.

In FIG. 1, reference numeral 81 designates a first labyrinth seal for preventing the leakage of cooling water from the inlet pipe 1 into the first outlet chamber 61. It is impossible to completely eliminate the leakage of liquid between a stationary part and a rotary part, but it is necessary to make maximum efforts to prevent the leakage of liquid. The liquid leaked into the chamber 61 will cause no serious difficulty because it is recirculated through the outlet pipe 71. However, it goes without saying that the amount of leaked liquid should be as small as possible because, if it is excessively large, the efficiency of the device is decreased.

A second labyrinth seal 82 is provided to prevent the leakage of liquid between the first outlet chamber 61 and the rotating pipe 4. A second outlet chamber 62 is provided for receiving the liquid which leaks through the second labyrinth seal 82 from the first outlet chamber 61. In the second outlet chamber 62, unlike the first outlet chamber 61, the cooling liquid is not fully filled therein and therefore the cooling liquid may be contaminated by contacting the air. In order to prevent this, a gas supplying pipe 9 is provided. Shielding gas such as nitrogen or hydrogen is supplied into the second outlet chamber 62 through the gas supplying pipe 9 at all times so that the pressure in the second outlet chamber 62 is maintained slightly higher than the ambient atmospheric pressure thereby preventing the entry of air into the second outlet chamber 62. Thus, the liquid leaked into the second outlet chamber 62 is not brought into contact with atmospheric air and accordingly not contaminated. Therefore, the cooling liquid discharged from the second outlet pipe 72 of the chamber 62 can be recirculated through a heat exchanger and a supply pump (none of which are shown) as in the case of the cooling liquid discharged from the first outlet chamber 61.

Further to FIG. 1, reference numeral 83 designates a third labyrinth seal for preventing the leakage of liquid between the second outlet chamber 62 and the rotation pipe 4. A sealing liquid at a slightly higher pressure than the shielding gas is supplied from a liquid supplying pipe 83a to the middle portion of the labyrinth seal 83. A part of the sealing liquid flows into the second outlet chamber 62 through a labyrinth seal 83c. As described above, the cooling liquid from the second outlet pipe 72 is recirculated without being subjected to water purifying treatment. Therefore, the sealing liquid must be pure water, substantially the same as the cooling liquid.

Yet further in FIG. 1, reference numeral 63 designates a third outlet chamber for receiving sealing liquid which has passed through the labyrinth seal 83b, and 73 a third outlet pipe communicating with the third outlet chamber 63. Since the third outlet pipe 73 communicates with the atmosphere, sealing liquid leaked into the chamber 63 is contaminated and therefore it is discarded without being recirculated. It goes without saying that if it is supplied to a retreatment device for water purification, it can be recirculated.

As described above, the sealing liquid (pure water) leaked into the third outlet chamber 63 is discarded or reprocessed. Therefore, in order to make the required capacity of the pure water supply or the size of the retreatment device as small as possible it is necessary to minimize the amount of sealing liquid leaked into the third outlet chamber.

A part of the conventional third seal 83, namely, a seal 83b disposed on the side of the third outlet chamber, 63 is a labyrinth seal. It is necessary to increase the length of the sealing part in order to minimize the amount of sealing liquid leaking into the third outlet chamber 63. On the other hand, because the rotor shaft 5 is supported by bearings (not shown), it is impossible to provide bearings for the supplying and draining pipe 4 because of the presence of the outlet chambers, and accordingly the pipe 4 is supported hanging over the rotor shaft 5. This results in lateral vibration of the pipe 4 continuously. Such lateral vibration is undesirable because it disturbs the sealing effect. Lateral vibration tends to increase as the length of the pipe 4 increases. Thus, it is desirable to make the pipe as short as possible. The above-described conventional device suffers from a problem in that the sealing effect cannot be increased without increasing the third seal's length and, accordingly, the length of the pipe 4. If the length of the third seal and accordingly the pipe 4 are increased, undesirable lateral vibration is increased accordingly.

Thus, it is necessary to provide a cooling liquid conducting device which is compact and has only a small lateral vibration in which the seal 83b disposed on the side of the third outlet chamber 63 is replaced by a seal which is shorter but more effective in sealing thereby minimizing the amount of sealing liquid leaking into the third outlet chamber 63.

In order to eliminate the necessity of increasing the size of a pure water manufacturing device or capacity of pure water supply, a method has been employed in which threads are cut in the outer wall of the supplying and draining pipe in a direction opposite to the direction of rotation of the pipe so that a pumping effect is provided by the threads and the confronting stationary surface 85 during high speed rotation thereby to minimize the amount of sealing liquid leaking into the third outlet chamber 63.

However, the conventional seal is disadvantageous in that when the supplying and draining pipe is stopped or when the rotational speed of the supplying and draining pipe 4 is low and accordingly the pumping effect is insufficient, a large amount of sealing liquid leaks into the third outlet chamber containing air. In this connection, the capacity of the sealing liquid supplying device must be determined from the amount of sealing liquid leakage when the pipe is stopped or run at low speed, and therefore the leakage of sealing liquid when the pipe is stopped or run at a low speed is the primary difficulty of the conventional seal.

Not only the above-described threads but also any structure in which sealing is effected by the pumping effect which is provided due to rotation suffers from a common difficulty that the sealing effect is lost or lowered when the pipe is stopped or run at a low speed.

As is apparent from the above description, the seal utilizing the pumping effect through rotation is advantageous in that it is contactless and is effectively operable even when the circumferential speed is high and vibration is present but is disadvantageous in that its sealing effect is greatly lowered when the supplying and draining pipe is stopped or run at a low speed.

SUMMARY OF THE INVENTION

Accordingly, an object of the invention is to prevent with a short sealing means the leakage of cooling liquid from an outlet chamber which receives cooling liquid from a cooling liquid supplying and draining pipe.

In order to achieve this object, a sealing means is provided which includes a thread seal and a stretchable member or a rubber seal, in combination. The stretchable member is expanded or contracted according to the pressure of gas introduced inside the stretchable member. The pressure of gas applied to the stretchable member is controlled according to the speed of rotation of a rotary electric machine to which the invention is applied or the amount of liquid leakage.

According to another aspect of the invention, the stretchable member is so modified that the width thereof is made larger than the thickness to further reduce the amount of liquid leakage.

The nature, principle and utility of the invention will become more apparent from the following detailed description and the appended claims when read in conjunction with the accompanying drawings.

DESCRIPTION OF THE PREFERRED EMBODIMENTS

Preferred embodiments of the invention will be described with reference to FIGS. 3 through 13.

Figure 3:
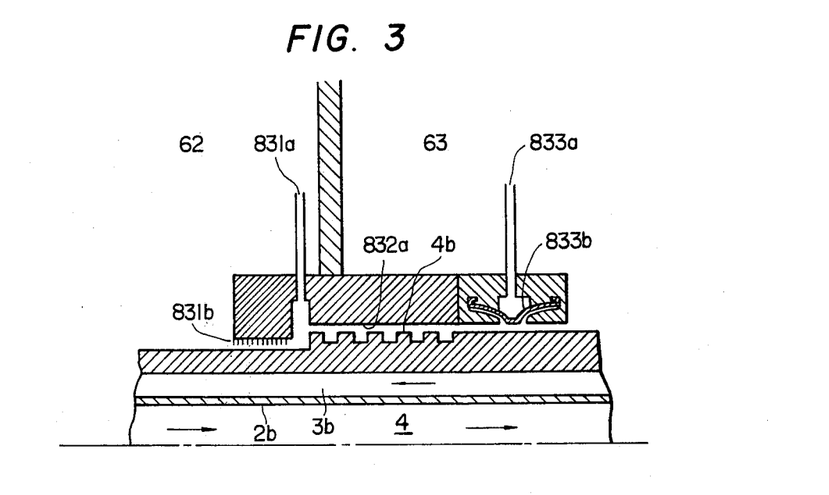
FIG. 3 is a longitudinal sectional view showing a first preferred embodiment of a cooling liquid conducting device constructed according to this invention.

FIG. 3 is an enlarged diagram showing a first preferred embodiment of a third seal constructed in accordance with the invention. In FIG. 3, reference numeral 831a designates a sealing liquid (pure water) supplying port through which sealing liquid at a slightly higher pressure than the shielding gas in the second outlet chamber 62 is supplied, and reference character 831b designates a labyrinth seal for suppressing the leakage of sealing liquid into the second outlet chamber 62.

The liquid leaking into the second outlet chamber 62 can be recirculated as it is because the chamber 62 is filled with the shielding gas. Therefore, the leakage of sealing liquid into the chamber 62 may be allowed to some extent. In addition, the difference in pressure between the sealing liquid and the shielding gas is small. Accordingly, a labyrinth seal of simple structure and high reliability can be employed.

Further in FIG. 3, reference numeral 4b designates threads which are cut in the outer surface of the above-described supplying and draining pipe 4 in a direction opposite to the direction of rotation thereof with the thread confronting a stationary surface 832 so that a pumping effect is provided during rotation to prevent the leakage of sealing liquid into the third outlet chamber 63.

An annular rubber member 833b is provided around the pipe 4. Compressed gas is supplied from a gas supplying pipe 833a to the rubber member 833b so that the rubber member 833b is made to abut against the outer wall of the pipe 4 or is maintained in a spaced relation to the outer wall of the pipe 4.

With the seal according to the invention, the annular rubber member 833b is made to abut against the outer wall of the supplying and draining pipe 4 to prevent the leakage of sealing liquid into the third outlet chamber when the pipe 4 is maintained stopped or when the pipe 4 is run at a low speed thus decreasing the pumping effect. The clearance between the annular rubber member 833b and the outer wall of the pipe 4 is minimized to suppress the leakage of sealing liquid into the third outlet chamber 63. When the pipe is run at a high speed, the pumping effect provided by the threads 4b and the stationary surface 832a is sufficient to prevent the leakage of sealing liquid into the third outlet chamber 63. That is, the amount of sealing liquid leaking into the third outlet chamber 63 is minimized over speeds ranging from stopped to high speed rotation.

The seal according to the invention is of a contactless type so that the axial position between the rotary surface and the stationary surface has some amount of freedom. Therefore, the seal is scarcely affected by vibration and axial thermal expansion of the supplying and draining pipe.

In the seal shown in FIG. 3, an annular rubber member 833b is employed to prevent the leakage of sealing liquid when the supplying and draining pipe 4 is stopped. However, the same effect can be obtained by using a stretchable synthetic resin member instead of the rubber member.

In the above-described embodiment, the technical concept of the invention is applied to the case where three outlet chambers are provided. The invention is applicable to the case also where two outlet chambers are provided as shown in FIG. 4.

Figure 4:
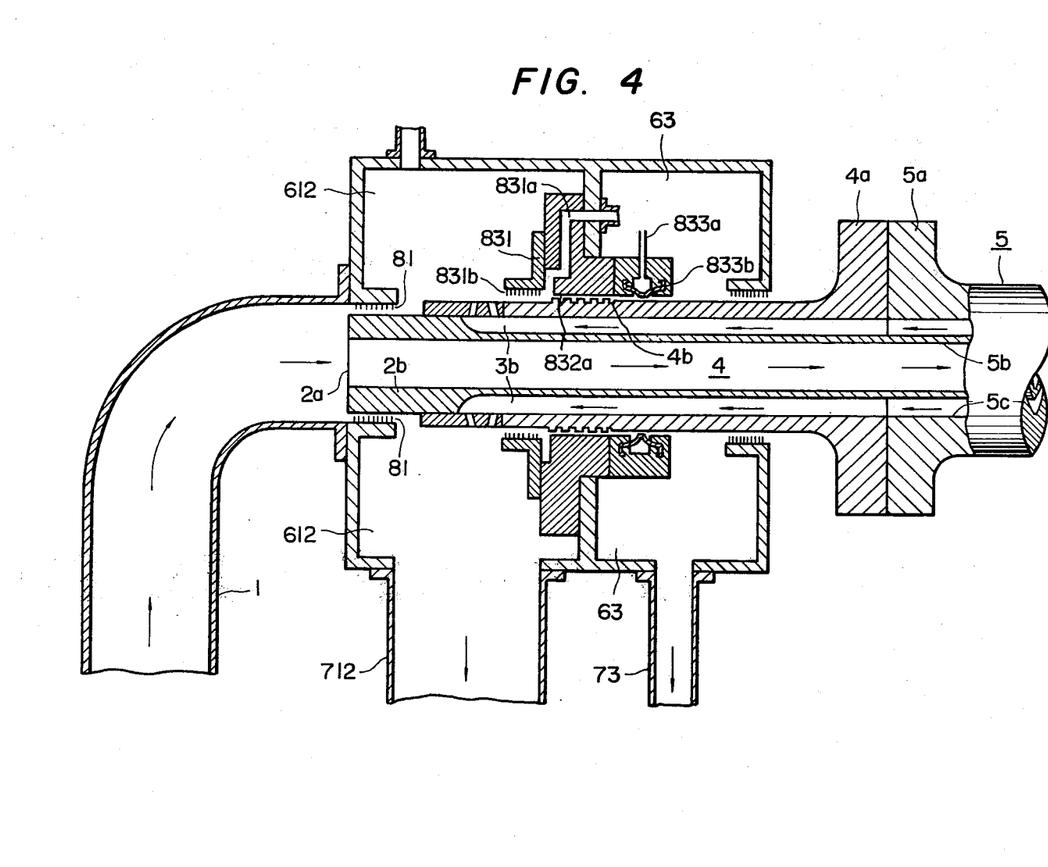
FIG. 4 is also a longitudinal sectional view showing a second embodiment of a device according to the invention.

In FIG. 4, reference numeral 612 designates an outlet chamber which is formed by constructing the outlet chambers 61 and 62 of FIG. 1 as a single unit. Reference numeral 712 designates an outlet pipe communicating with the outlet chamber 612 and 9 a gas supplying pipe similar to that of FIG. 1. The outlet chamber 612 is not fully filled with cooling liquid. Shielding gas is supplied through the gas supplying pipe 9 into the outlet chamber 612 so that the pressure therein is slightly higher than atmospheric pressure thereby preventing the cooling liquid from being coming into contact with atmospheric air. That is, the outlet chamber 612 is formed by combining the two outlet chambers 61 and 62 into one unit and the cooling liquid discharged from the outlet pipe 712 is recirculated as in the case of FIG. 1.

In each of the embodiments shown in FIGS. 3 and 4, the thread seal and the rubber seal are used in the combination to minimize the leakage of sealing liquid into the third outlet chamber 63. If the air pressure applied to the rubber seal is controlled according to the speed of rotation of the supplying and draining pipe 4, the leakage of sealing liquid can be further decreased.

Figure 5:
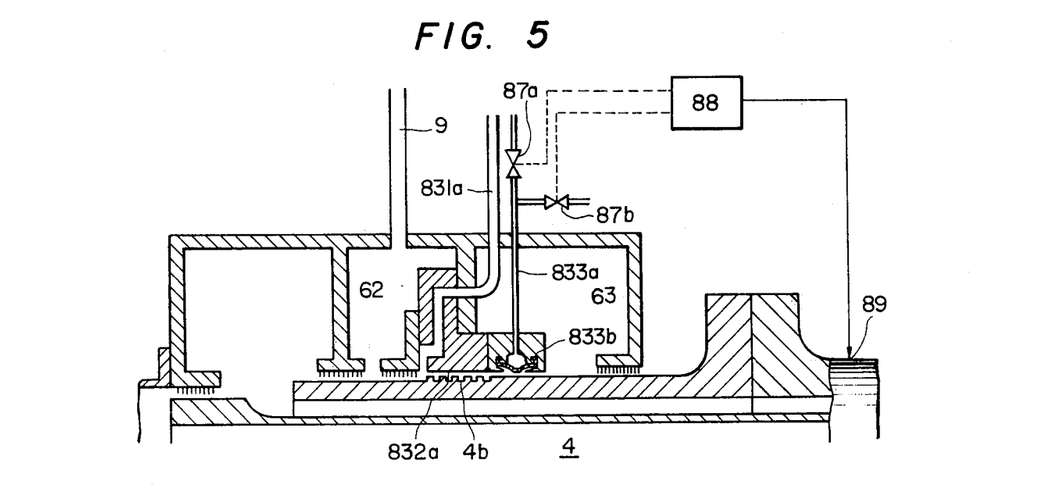
FIG. 5 is a longitudinal sectional view showing a third embodiment of a device according to the invention.

FIG. 5 shows another embodiment of the invention. In FIG. 5, the second outlet chamber 62 is filled with shielding gas the pressure of which is slightly higher than atmospheric pressure. The shielding gas is introduced through the gas supplying pipe 9. A sealing liquid supplying pipe 831a is provided as shown in FIG. 5 with the sealing liquid being slightly higher in pressure than the shielding gas. Threads 4b are cut in the outer wall of the cooling liquid supplying and draining pipe 4 in a direction opposite to the direction of rotation thereof. A pumping effect is produced by the threads 4b and the stationary surface 832a which seals the sealing liquid. An annular rubber seal 833b is provided surrounding the pipe 4 and is constructed such that, when compressed gas is applied through a gas supplying pipe 833a to the rubber seal 833b, the seal 833b contracts to adjust the gap between the rubber seal and the pipe 4. Furthermore, valves 87a and 87b are provided to control the pressure of the gas applied to the annular rubber seal 833b. For instance, the valve 87a is connected to a compressed gas supplying device and the valve 87b is communicated with the atmosphere.

The valves 87a and 87b are controlled by a control device 88. More specifically, the degrees of opening of the valves 87a and 87b are controlled according to a predetermined program in response to signals from a speed of revolution detecting device 89.

Figure 6:
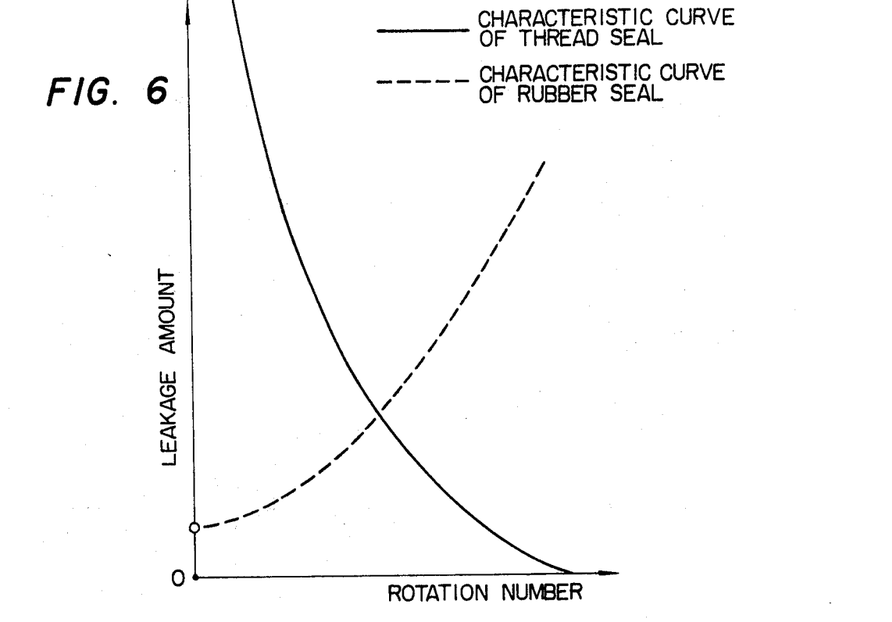
FIGS. 6, 7 and 8 are graphical representations indicating the characteristic curves of sealing means according to the invention.

Sealing by the pumping effect provided by the threads 4b and the stationary surface 832a (hereinafter referred to as "a thread seal" when applicable) is effected when the speed of rotation of the pipe reaches a certain value as indicated in FIG. 6. The annular rubber seal 833b (hereinafter referred to as "a rubber seal" when applicable) is abutted against the outer wall of the supplying and draining pipe 4 when the pipe 4 is stopped to completely prevent the leakage of liquid. However, during rotation, it is necessary that a gap be formed between the outer wall of the pipe 4 and the annular rubber seal 833b which is larger than the smallest gap, which is determined from the speed of rotation, which will protect the annular rubber seal 833b from wear and seizure. That is, it is necessary for the rubber seal to increase the amount of leakage with an increasing speed of rotation in order to protect the annular rubber seal from seizure and wear as indicated in FIG. 6.

As is apparent from FIG. 6, the characteristic curve of the thread seal intersects the characteristic curve of rubber seal at a certain speed of rotation. That is, when the speed of rotation is lower than the certain speed of rotation, the sealing effect of the thread seal is not sufficient while simultaneously the sealing effect of the rubber seal is sufficient.

The control device 88 controls the degrees of opening of the valves 87a and 87b according to the following program, for instance, so that, in response to signals from the speed device 89, the thread seal and the rubber seal are employed in combination for speed ranges in which the sealing effect of the thread seal is insufficient and only the thread seal is employed for higher speed ranges.

Figure 7:
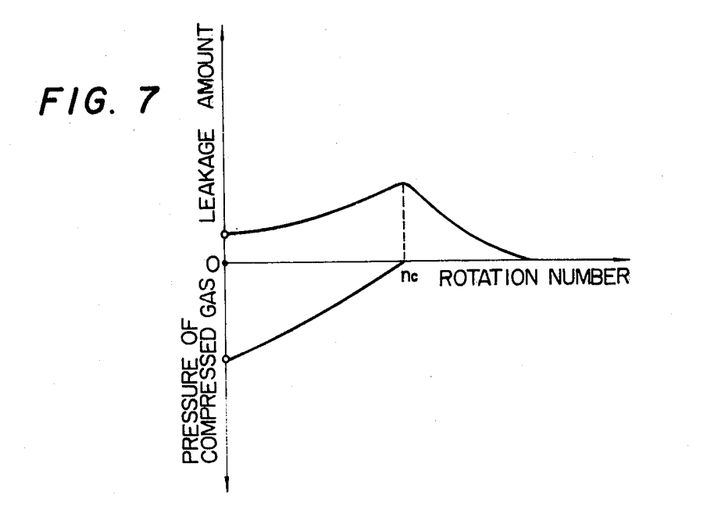

As illustrated in FIG. 7, the degrees of opening of the valves 87a and 87b are controlled by the control device 88 so that, when the pipe 4 is stopped, the rubber seal is abutted against the outer wall of the pipe 4 to completely prevent the leakage of liquid. Until the speed of rotation reaches a value $n_c$, the control device 88 controls the degrees of opening of the valves 87a and 87b according to the speed of rotation to control the pressure of the compressed gas applied to the rubber seal thereby to obtain the smallest amount of leakage and to protect the rubber seal from water and seizure. When the speed of rotation reaches a value $n_c$ and higher, the sealing effect of the thread seal becomes sufficient and therefore the control device 88 controls the degrees of opening of the valves 87a and 87b so that the pressure of the compressed gas applied to the rubber seal becomes zero. In summary, the control device 88 controls the valves 87a and 87b according to the speed of rotation so that the pressure of the compressed gas applied to the rubber seal varies as shown in the lower half of FIG. 7.

Figure 8:
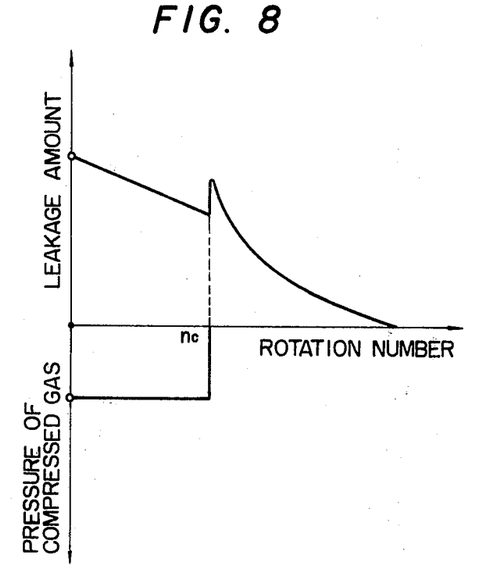

FIG. 8 shows graphically an example of a control operation in which the pressure of the compressed gas supplied to the rubber seal is maintained unchanged when the speed of rotation is in a low speed range in which the speed of rotation is lower than the value $n_c$. In this case, the compressed gas pressure applied to the rubber seal is determined so that, at the speed of rotation $n_c$, the rubber seal is prevented from seizure and wear. Therefore, the amount of leakage may increase during low speed rotation compared with the amount of leakage for the case of FIG. 7. However, this control procedure is advantageous in that the control device 88 is simpler in construction.

In the above-described embodiments, the thread seal is employed as a sealing means utilizing the pumping effect provided by rotation. However, any sealing means can be employed if it utilizes the pumping effect provided by rotation (hereinafter referred to as "a rotational pumping effect" when applicable).

Figure 9:
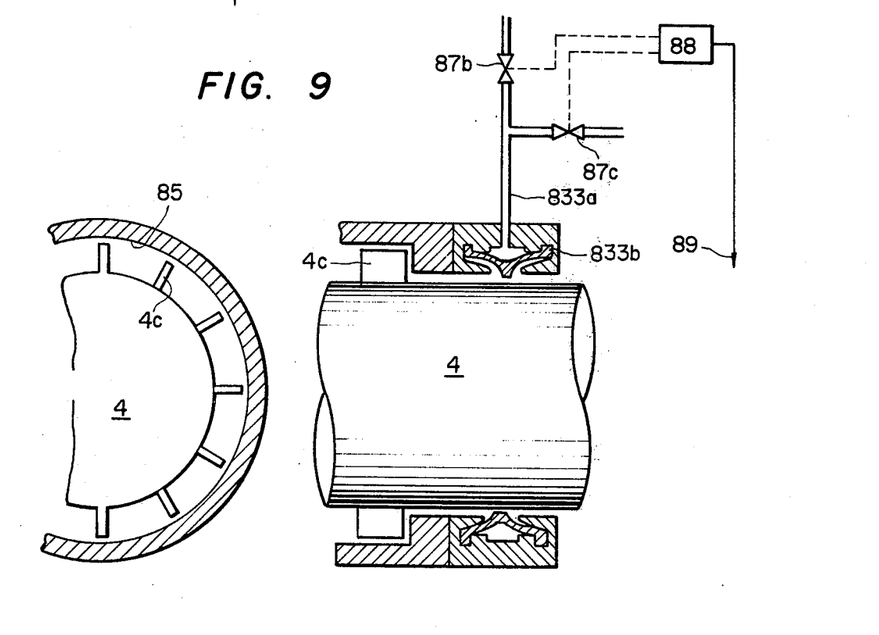
FIG. 9 is a longitudinal sectional view showing a fourth embodiment of a device of the invention.

FIG. 9 shows an example of a sealing device other than the thread seal which utilizes the rotational pumping effect. As shown in FIG. 9, vanes 4c are provided on the outer wall of the cooling liquid supplying and draining pipe 4. During rotation, the vanes 4c produce the pumping effect to prevent the leakage of liquid. In FIG. 9, reference character 833b designates an annular rubber seal, 87 a gas supplying pipe, 87a and 87b valves, 88 a control device and 89 a speed of revolution detecting device. These components function similarly to the corresponding components in the embodiment of FIG. 5.

In the above-described embodiments, the control device 88 receives signals from the speed device 89. However, the control device may be so designed that it receives signals from a leakage detecting device (not shown) provided at the outlet chamber 63.

The rotor shaft 5 connected directly to the supplying and draining pipe 4 is supported by slide bearings (not shown) so that the pipe 4 may be moved in a floating mode or, as the pipe 4 overhangs from the rotor shaft 5, the pipe 4 may tend to vibrate greatly when the speed of rotation reaches the resonance rotation speed. Therefore, it is necessary for the annular rubber seal 833b to be able to follow the motion of the pipe 4 with a small clearance therebetween.

An ordinary annular rubber seal cannot follow the motion of the pipe 4. Accordingly, in the case where the supplying and draining pipe is rotated with a small clearance as mentioned between the pipe and the annular rubber seal, the rubber seal may suffer from seizure and wear.

Figure 10:
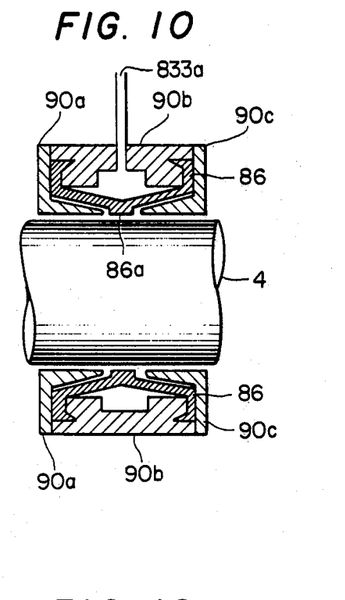
FIG. 10 is a sectional view showing a modification of the sealing means according to the invention.
Figure 11:
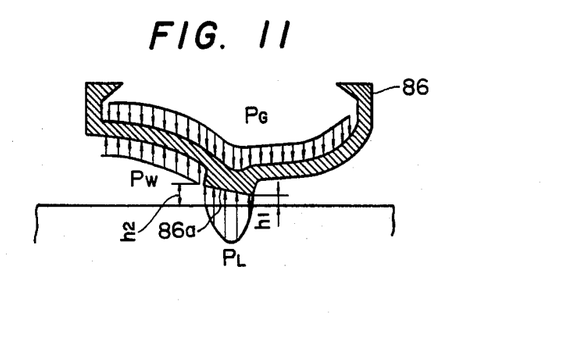
FIG. 11 is a sectional view showing one state of the sealing means shown in FIG. 10 to which pressure is applied.

FIG. 10 shows an embodiment of the annular rubber seal in which the difficulty described above has been eliminated. In this annular rubber seal, the ratio of width to thickness is increased due to the reason discussed below. FIG. 11 shows a state of the annular rubber seal 86 (FIG. 10) under pressure. In FIG. 11, reference character $P_G$ designates the pressure of the compressed gas, $P_W$ the pressure of the liquid to be sealed, and $P_L$ the pressure of the liquid applied to a surface 86a of the annular rubber seal. The pressure $P_G$ is distributed uniformly over the outer surface of the rubber seal while the pressure $P_W$ is applied only to half of the inner surface of the rubber seal as a result of which the rubber seal is inclined as shown in FIG. 11. Because of this inclination, the pressure $P_L$ applied to the surface 86a of the rubber seal can be represented by a curve which extends above a straight line connecting $P_W$ and O as indicated in FIG. 11.

Figure 12:
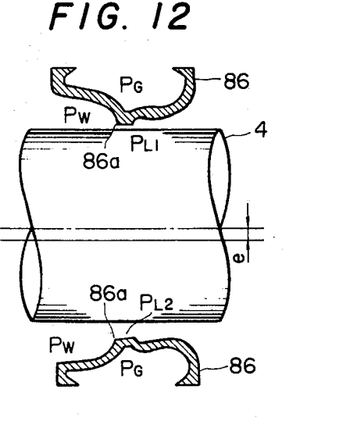
FIG. 12 is a sectional view for a description of the case where the axis of a shaft surrounded by the sealing means in FIG. 10 is shifted.
Figure 13:
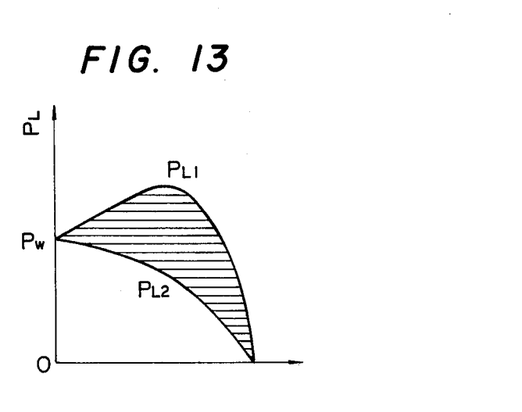
FIG. 13 is a graphical representation showing the distributions of pressures when the shaft is shifted as shown in FIG. 12.

FIG. 12 shows a state of the cooling liquid supplying and draining pipe 4 which is eccentric by as much as e. As a result of the eccentricity of the pipe 4, the gap between the pipe 4 and the surface 86 of the rubber seal is decreased as shown in the upper half of FIG. 12 while it is increased as shown in the lower half of FIG. 12. Therefore, the pressure $PL_1$ applied to the upper half of the annular rubber seal surface 86a and the pressure $PL_2$ applied to the lower half of the seal surface have different distributions as indicated in FIG. 13. That is, the pressure $PL_1$ in the smaller gap between the pipe 4 and the surface 86a is higher than the pressure $PL_2$ in the larger gap. In other words, the pressure applied to the upper half of the rubber seal is different from that applied to the lower half as a result of which a force (which is shown shaded in FIG. 13 with horizontal lines) depresses the annular rubber seal 86 so that the seal 86 is equally spaced from the pipe 4. Thus, the annular rubber seal 86 shown in FIG. 10 performs the function of following the motion of the pipe 4.

According to known principles hydrodynamics, the integration value of PL becomes a maximum when a relation $h_2/h_1 = 2.2$ is established between the gaps $h_1$ and $h_2$ shown in FIG. 11. Accordingly, the most satisfactory result can be obtained by employing the following technique. The minimum gap with which the annular rubber seal starts wearing under the highest speed of rotation in sealing the liquid with the rubber seal 86 is set to $h_1$ and the dimensions of the rubber seal are determined so that the rubber seal is inclined as $h_2 = 2.2h_1$ with the pressures $P_G$ and $P_W$ at that time.

In the above-described embodiments, pure water is employed as the cooling liquid although a liquid other than pure water can be employed if it does not corrode the pipes and the rotor coil.

While the invention has been described with reference to an electric generator, especially a turbine generator, it should be noted that the invention is applicable to not only other types of electric generators such as water-wheel generators but also various types of rotary electric machines such as electric motors.

Furthermore, in the above-described embodiments, labyrinth seals are employed as the seals 81 and 82 for minimizing the leakage of cooling liquid although other types of seals such as mechanical seals can be employed.

As is clear from the above description, according to the invention, a thread seal employing the pumping effect and a rubber seal employing the annular rubber seal providing a variable clearance between the supplying and draining pipe and the annular rubber seal itself are used in combination to minimize the leakage of sealing liquid into the outlet chamber filled with atmospheric air. Thus, the invention is advantageous in that leakage of sealing liquid is minimized with a short sealing length and, as the shaft length can be accordingly reduced, the lateral vibration of the pipe is decreased.

Furthermore, according to the invention, the compressed gas pressure applied to the rubber seal is controlled according to the speed of rotation and the amount of leakage. Therefore, the seal mechanism of the invention minimizes the amount of leakage in all speed ranges from a zero speed of rotation to the highest speed of rotation.

In addition, according to the invention, the ratio of width to thickness of the annular rubber seal is made larger with the result that the annular rubber seal can satisfactorily follow the motion of the shaft. Accordingly, in the cooling liquid conducting device of the invention, even if the shaft is rotated with a small clearance between the annular rubber seal and the shaft, the rubber seal has little tendency to seize or wear.

What is claimed is:

1. A device for conducting cooling liquid out of a liquid cooled rotor type rotary electric machine comprising:
    a supplying and draining pipe coupled to the rotor shaft of said rotary electric machine for supplying cooling liquid to and draining cooling liquid from said rotor shaft;
    an outlet chamber disposed around said supplying and draining pipe with a gap provided between said outlet chamber and said supplying and draining pipe for receiving cooling liquid discharged from said supplying and draining pipe and discharging cooling liquid thus received, said outlet chamber being filled with a shielding gas under pressure;
    means for supplying a sealing liquid into said gap at one end of said outlet chamber; and
    threads being cut in the outer wall of said supplying and draining pipe so as to pressurize said sealing liquid towards said outlet chamber; and
    a stretchable member surrounding the outer wall of said supplying and draining pipe in such a manner that, when said supplying and draining pipe is stopped, said stretchable member is brought into close contact with the outer wall of said supplying and draining pipe to seal said sealing liquid.

2. The device as claimed in claim 1 in which said threads are arranged to provide a pumping effect as said supplying and draining pipe is rotated to prevent the leakage of said sealing liquid.

3. A device for conducting cooling liquid out of a liquid cooled rotor type rotary electric machine comprising:
    a supplying and draining pipe coupled to the rotor shaft of said rotary electric machine for supplying cooling liquid to and draining cooling liquid from said rotor shaft;
    an outlet chamber disposed around said supplying and draining pipe with a gap provided between said outlet chamber and said supplying and draining pipe for receiving cooling liquid discharged from said supplying and draining pipe and discharging cooling liquid thus received, said outlet chamber being filled with a shielding gas under pressure;
    means for supplying a sealing liquid into said gap at one end of said outlet chamber;
    a plurality of vanes provided on the outer wall of said supplying and draining pipe so as to pressurize said sealing liquid towards said outlet chamber; and
    a stretchable member surrounding the outer wall of said supplying and draining pipe in such a manner that, when said supplying and draining pipe is stopped, said stretchable member is brought into close contact with the outer wall of said supplying and draining pipe to seal said sealing liquid.

4. The device as claimed in claim 1, 2 or 3 further comprising means for introducing a gas to a chamber inside said stretchable member, a gap between said stretchable member and said supplying and draining pipe being controlled in accordance with the pressure of said gas introduced inside said stretchable member.

5. The device as claimed in claim 1, 2 or 3 further comprising a control device for controlling the pressure of said gas applied to said stretchable member in accordance with the speed of rotation of said rotor shaft.

6. The device as claimed in claim 1, 2 or 3 further comprising a control device for controlling the pressure of said gas applied to said stretchable member in accordance with an amount of leakage of said sealing liquid.

7. The device as claimed in claim 1, 2 or 3 in which the width of said stretchable member is larger than the thickness thereof.